(12) United States Patent
Kato

(10) Patent No.: US 12,173,784 B2
(45) Date of Patent: Dec. 24, 2024

(54) OIL SHORTAGE DETERMINING SYSTEM

(71) Applicant: TOYOTA JIDOSHA KABUSHIKI KAISHA, Toyota (JP)

(72) Inventor: Yosuke Kato, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 365 days.

(21) Appl. No.: 17/650,746

(22) Filed: Feb. 11, 2022

(65) Prior Publication Data
US 2022/0260151 A1    Aug. 18, 2022

(30) Foreign Application Priority Data
Feb. 18, 2021  (JP) .................. 2021-024473

(51) Int. Cl.
*F16H 57/04*    (2010.01)

(52) U.S. Cl.
CPC ..... F16H 57/0449 (2013.01); F16H 57/0412 (2013.01)

(58) Field of Classification Search
CPC .... F16H 57/0449; F16H 57/0412; F16H 3/72; B60Y 2306/03; B60Y 2306/05; B60Y 2400/302; B60K 11/02; B60K 2001/006; B60K 1/02; F16N 7/38; F16N 29/00; F16N 39/02
USPC ............................................ 701/31
See application file for complete search history.

(56) References Cited

U.S. PATENT DOCUMENTS

| | | | |
|---|---|---|---|
| 2008/0300746 A1* | 12/2008 | Dreier | F16H 57/01 701/31.4 |
| 2016/0101771 A1* | 4/2016 | Hata | B60K 6/48 903/910 |
| 2016/0101776 A1* | 4/2016 | Hata | B60K 6/365 903/910 |
| 2017/0144532 A1* | 5/2017 | Tokozakura | B60K 6/445 |
| 2018/0347418 A1* | 12/2018 | Miyazaki | F01M 5/007 |
| 2019/0389301 A1* | 12/2019 | Kanda | B60L 15/20 |
| 2019/0390617 A1* | 12/2019 | Nakashima | F02D 35/00 |
| 2020/0072100 A1* | 3/2020 | Hosogi | F01M 1/16 |
| 2020/0122543 A1* | 4/2020 | Lee | B60H 1/00885 |
| 2022/0074488 A1 | 3/2022 | Miyamoto | |

FOREIGN PATENT DOCUMENTS

| | | | | |
|---|---|---|---|---|
| CN | 106828078 A | | 6/2017 | |
| CN | 107306272 A | | 10/2017 | |
| JP | 2013207957 A | * | 10/2013 | |
| JP | 2018-42414 A | | 3/2018 | |
| WO | WO-2020137565 A1 | * | 7/2020 | ......... F16H 57/0445 |

* cited by examiner

*Primary Examiner* — Adam D Tissot
*Assistant Examiner* — Jean W Charleston
(74) *Attorney, Agent, or Firm* — Oblon, McClelland, Maier & Neustadt, L.L.P.

(57) ABSTRACT

In a vehicle including a first MG serving as a driving source, a power transmission mechanism configured to transmit power of the first MG to a drive wheel, and an oil circulation mechanism for cooling the power transmission mechanism and the first MG, it is determined that oil is short when a temperature of the first MG is higher than a temperature of the oil and a difference between the temperature of the first MG and the temperature of the oil is greater than a prescribed value.

7 Claims, 2 Drawing Sheets

OIL SHORTAGE DETERMINING SYSTEM

CROSS-REFERENCE TO RELATED APPLICATION

This application claims priority to Japanese Patent Application No. 2021-024473 filed on Feb. 18, 2021, incorporated herein by reference in its entirety.

BACKGROUND

1. Technical Field

The disclosure relates to an oil shortage determining system.

2. Description of Related Art

A vehicle described in Japanese Unexamined Patent Application Publication No. 2013-207957 (JP 2013-207957 A) includes a motor, a case that accommodates the motor, an oil circulation mechanism, and a controller. The motor is coupled to drive wheels via a gear mechanism and the like. In other words, the motor is a driving source of the vehicle. The oil circulation mechanism includes a pump for pumping oil. The pump supplies oil accumulated on the bottom of the case to the motor and the like. Oil pumped by the pump cools the motor and the mechanisms located inside the case and accumulates on the bottom of the case again thereafter. The controller controls the pump and the like to regulate the flow rate of oil to be supplied into the case.

SUMMARY

In the vehicle as described in JP 2013-207957 A, the total amount of oil in the oil circulation mechanism can be short due to forgetting to fill the oil circulation mechanism with oil or leakage of oil from the oil circulation mechanism. In this case, even when the flow rate of oil to the motor is controlled, the mechanisms inside the case of the motor and the like cannot be sufficiently cooled, so inconvenience, such as seizure, may occur in the motor and its associated components.

An oil shortage determining system includes a motor serving as a driving source of a vehicle, a power transmission mechanism configured to transmit power of the motor to a drive wheel of the vehicle, an oil circulation mechanism configured to circulate oil for cooling the power transmission mechanism and the motor, a first temperature sensor configured to detect a temperature of the motor, a second temperature sensor configured to detect a temperature of the oil, and a determining device configured to determine whether there is a shortage of oil. The determining device is configured to execute an acquisition process of acquiring a temperature of the motor and a temperature of the oil, and a determining process of determining whether there is a shortage of the oil based on the temperature of the motor and the temperature of the oil. In the determining process, the determining device is configured to determine that the oil is short when the temperature of the motor is higher than the temperature of the oil and a difference between the temperature of the motor and the temperature of the oil is greater than a predetermined prescribed value.

When the oil is short and the motor is not cooled by the oil, the temperature of the motor is considerably higher than the temperature of the oil. Because of such a causal relationship, whether there is a shortage of the oil is determined by checking the difference between the temperature of the motor and the temperature of the oil.

In the oil shortage determining system, where a duration from when an ignition switch of the vehicle is turned on to when the ignition switch is turned off is one trip, the determining device may be configured to, when the temperature of the oil to be acquired in the initial acquisition process of each trip is lower than or equal to a predetermined threshold, prohibit a determination that the oil is short in the determining process until the trip ends, and the determining device may be configured to, when the temperature of the oil to be acquired in the initial acquisition process of each trip is higher than the threshold, execute the determining process without prohibiting a determination that the oil is short until the trip ends.

In an environment in which an ambient temperature is low, the viscosity of oil increases, and the liquidity of oil decreases. In this case, although there is no shortage of oil, oil may not be supplied to the motor due to a decrease in the liquidity of oil. In this case, a difference between the temperature of the motor and the temperature of the oil increases because the motor is not cooled by the oil although there is no shortage of the oil, so a shortage of the oil may be erroneously determined. With the above configuration, determining a shortage of oil in such a situation is prohibited. Therefore, an erroneous determination as described above is prevented.

In the oil shortage determining system, the determining device may include an internal device provided in a target vehicle that is a vehicle set as a target for determination as to whether there is a shortage of the oil, and an external device provided outside the target vehicle, the external device may be capable of wirelessly communicating with the internal device and may store the prescribed value for each of a plurality of vehicle types, the internal device may be configured to execute the acquisition process and a transmission process of transmitting information on the temperature of the motor and the temperature of the oil, acquired in the acquisition process, to the external device together with vehicle type information of the target vehicle, the external device may be configured to execute a receiving process of receiving the information transmitted in the transmission process, an identification process of identifying the prescribed value associated with the vehicle type information received in the receiving process, and the determining process, and, in the determining process, the external device may be configure to acquire a difference between the temperature of the motor and the temperature of the oil based on the information acquired in the receiving process, and compare the acquired difference with the prescribed value identified in the identification process.

With this configuration, the external device that executes the determining process can be shared among a plurality of vehicles, so management of the external device is simple. In addition, the external device determines whether there is a shortage of the oil by using a prescribed value according to a vehicle type of a target for determination, so, in the configuration in which the external device is shared among a plurality of vehicles, high determination accuracy is ensured for each of different-type vehicles.

In the oil shortage determining system, the internal device may store a maximum value in historical data of a difference between the temperature of the motor and the temperature of the oil, acquired in the acquisition process, and the internal device may be configured to, only when a difference between a latest temperature of the motor and a latest temperature of the oil is greater than the maximum value, transmit the latest temperature of the motor and the latest temperature of the oil in the transmission process.

With this configuration, the temperature of the motor and the temperature of the oil are transmitted only when the difference between the temperature of the motor and the temperature of the oil is considerably large. Therefore, the number of times of communication between the internal device and the external device is reduced.

In the oil shortage determining system, the external device may be configured to, when the external device determines in the determining process that the oil is short, execute a notification process of providing notification of a shortage of the oil to the internal device. With this configuration, notification of a shortage of the oil can be provided to a user of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of an oil shortage determining system will be described with reference to the accompanying drawings.

Schematic Configuration of Server

Figure 1:
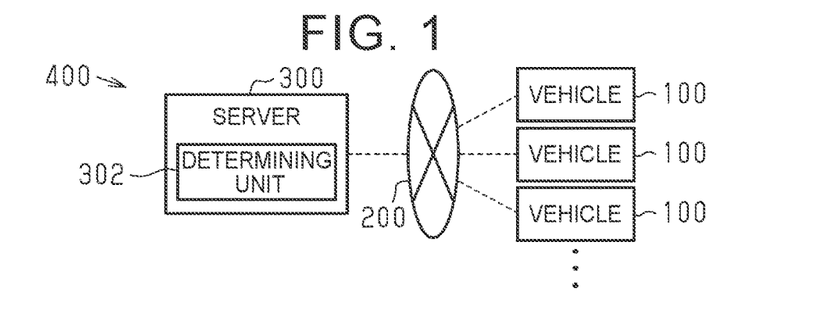
FIG. 1 is a schematic configuration diagram of an after-sales service system.

As shown in FIG. 1, an after-sales service system 400 includes a server 300 and a plurality of vehicles 100. The server 300 is a computer that collects and analyzes data of the vehicles 100. The server 300 is an external device that is a processing device provided outside the vehicles 100. The server 300 can be made up of one or more processors that execute various processes in accordance with a computer program (software). The server 300 may be made up of one or more dedicated hardware circuits, such as application-specific integrated circuits (ASICs), that execute at least some of the various processes, or circuitry including a combination of them. Each processor includes a CPU, and a memory, such as a RAM and a ROM. The memory stores a program code or an instruction configured to cause the CPU to execute a process. The memory, that is, a computer-readable medium, includes any usable medium accessible by a general-purpose or dedicated computer. The server 300 includes a storage device that is an electrically rewritable nonvolatile memory. The server 300 includes a communication instrument for wirelessly communicating with an external device via an external communication line network 200.

The server 300 stores individual identification information of each vehicle 100 so that the vehicles 100 subjected to collection of data are individually identified. Individual identification information includes information, for example, the vehicle type, vehicle body serial number, and vehicle identification number label of each vehicle 100. The server 300 includes a determining unit 302 for determining whether there is a shortage of oil in each vehicle 100. The details of the determining unit 302 will be described later.

Schematic Configuration of Vehicle

The vehicles 100 registered in the server 300 are hybrid vehicles. The vehicles 100 are of different types, but the vehicles 100 have the same basic configuration. Hereinafter, the basic configuration of each vehicle 100 will be described.

Figure 2:
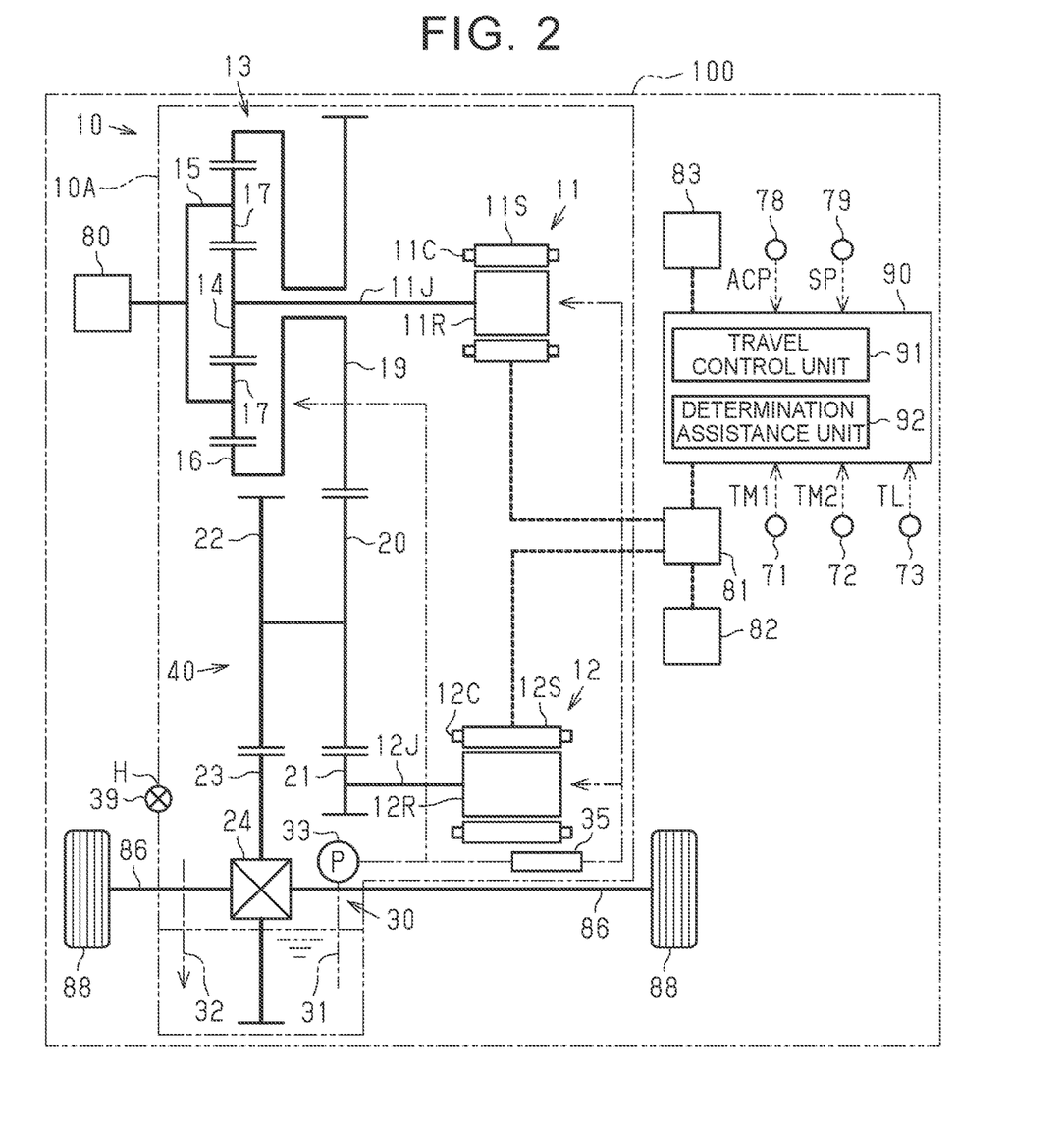
FIG. 2 is a schematic configuration diagram of a vehicle.

As shown in FIG. 2, the vehicle 100 includes an internal combustion engine 80, a transaxle 10, a plurality of drive shafts 86, and a plurality of drive wheels 88. The internal combustion engine 80 is connected to the transaxle 10. The transaxle 10 is connected to the drive wheels 88 via the pair of drive shafts 86. The transaxle 10 includes a first motor generator (hereinafter, referred to as first MG) 11 and a second motor generator (hereinafter, referred to as second MG) 12. The first MG 11 and the second MG 12 both are generator motors. The first MG 11 and the second MG 12 serve as driving sources of the vehicle 100 together with the internal combustion engine 80. The drive wheels 88 rotate together with the drive shafts 86 in accordance with the driving force of the first MG 11, the second MG 12, and the internal combustion engine 80. The vehicle 100 includes a power control unit (hereinafter, referred to as PCU) 81 and a battery 82. The first MG 11 and the second MG 12 are electrically connected to the battery 82 via the PCU 81. The battery 82 supplies electric power to the first MG 11 and the second MG 12 and stores electric power supplied from the first MG 11 and the second MG 12. The PCU 81 includes an inverter that performs power conversion between direct-current power and alternating-current power. The PCU 81 adjusts the amount of electric power exchanged between the battery 82 and each of the first MG 11 and the second MG 12.

The transaxle 10 will be described in detail. The transaxle 10 includes a case 10A in addition to the first MG 11 and the second MG 12. The transaxle 10 includes a power transmission mechanism 40 that transmits the driving force of the first MG 11, the second MG 12, and the internal combustion engine 80 to the drive shafts 86 and further to the drive wheels 88. The power transmission mechanism 40 includes a planetary gear train 13, a counter drive gear 19, a counter driven gear 20, a final drive gear 22, a final driven gear 23, a reduction gear 21, and a differential mechanism 24.

The case 10A is hollow. The case 10A accommodates the first MG 11, the second MG 12, and the power transmission mechanism 40. The first MG 11 includes a stator 11S, a coil 11C, a rotor 11R, and a rotary shaft 11J. The stator 11S has substantially a cylindrical shape. The coil 11C is in a state mounted on the stator 11S. The rotor 11R is located inside the stator 11S. The rotor 11R has substantially a cylindrical shape. The central axis of the rotor 11R coincides with the central axis of the stator 11S. The rotor 11R is rotatable relative to the stator 11S. The rotary shaft 11J extends through the rotor 11R. The central axis of the rotary shaft 11J coincides with the central axis of the rotor 11R. The rotary shaft 11J rotates integrally with the rotor 11R.

The second MG 12 includes a stator 12S, a coil 12C, a rotor 12R, and a rotary shaft 12J. The configuration of the second MG 12 is the same as the configuration of the first MG 11. For this reason, the detailed description of the configuration of the second MG 12 is omitted. The rotary shaft 12J of the second MG 12 is coupled to the reduction gear 21. The reduction gear 21 amplifies and outputs the torque of the rotary shaft 12J.

The planetary gear train 13 includes a sun gear 14, a ring gear 16, a plurality of pinion gears 17, and a carrier 15. The sun gear 14 is an external gear. The ring gear 16 is an internal gear. The ring gear 16 is located radially outside the sun gear 14 when viewed along the central axis of the sun gear 14. The pinion gears 17 are interposed between the sun gear 14 and the ring gear 16 and are in mesh with both the sun gear 14 and the ring gear 16. The carrier 15 holds the pinion gears 17 such that the pinion gears 17 are rotatable and revolvable. The sun gear 14 is coupled to the rotary shaft 11J of the first MG 11. The carrier 15 is coupled to the output shaft of the internal combustion engine 80. The internal combustion engine 80 is located outside the case 10A. The output shaft of the internal combustion engine 80 extends through the case 10A.

The ring gear 16 of the planetary gear train 13 is coupled to the counter drive gear 19. The ring gear 16 and the counter drive gear 19 are integrally rotatable. The counter drive gear 19 is in mesh with the counter driven gear 20. The counter driven gear 20 is in mesh with the reduction gear 21 coupled to the rotary shaft 12J of the second MG 12.

The counter driven gear 20 is coupled to the final drive gear 22 so as to be rotatable integrally with the final drive gear 22. The final drive gear 22 is in mesh with the final driven gear 23. The final driven gear 23 is coupled to the drive shafts 86 via the differential mechanism 24. The differential mechanism 24 allows a rotation speed difference between the drive shafts 86. The drive wheels 88 are located outside the case 10A. The drive shafts 86 extend through the case 10A.

The case 10A stores oil. Oil is used to cool and lubricate various areas of the transaxle 10, including the first MG 11, the second MG 12, and the planetary gear train 13.

The case 10A has a hole H and a lid 39. The hole H extends through the wall of the case 10A. The lid 39 closes the hole H. The lid 39 is detachable from the hole H. In a state where the lid 39 is removed from the hole H, oil can be fed into the case 10A through the hole H.

The transaxle 10 includes an oil circulation mechanism 30. The oil circulation mechanism 30 includes an oil supply channel 31, an oil return channel 32, an oil pump 33, and an oil cooler 35. The oil supply channel 31 is a channel for oil. The oil supply channel 31 extends from the bottom of the case 10A. The oil supply channel 31 bifurcates in the middle to reach the first MG 11 and the second MG 12. The oil pump 33 is located on the upstream side of the bifurcated point in the oil supply channel 31. The oil pump 33 pumps the oil stored at the bottom of the case 10A to the first MG 11 and the second MG 12. The oil cooler 35 is located between the oil pump 33 and the bifurcated point in the oil supply channel 31. The oil cooler 35 cools the oil. Although not shown in the drawing, part of the oil supply channel 31 branches off from between the oil pump 33 and the oil cooler 35 and reaches the planetary gear train 13 and the other gears. The oil return channel 32 is a channel for oil. The oil return channel 32 reaches from various areas in the case 10A to the bottom of the case 10A. Therefore, oil pumped by the oil pump 33 reaches from the bottom of the case 10A to various areas in the case 10A through the oil supply channel 31 and returns from the various areas in the case 10A to the bottom of the case 10A through the oil return channel 32. In other words, the oil circulation mechanism 30 has a circulation path along which oil circulates in the case 10A.

The transaxle 10 includes a first MG sensor 71, a second MG sensor 72, and an oil temperature sensor 73. The first MG sensor 71 detects the temperature of the coil 11C of the first MG 11 as a first motor temperature TM1. The second MG sensor 72 detects the temperature of the coil 12C of the second MG 12 as a second motor temperature TM2. Each of the first MG sensor 71 and the second MG sensor 72 is a first temperature sensor. The oil temperature sensor 73 detects the temperature of oil flowing through the oil supply channel 31 as an oil temperature TL. The oil temperature sensor 73 is located on the downstream side of the oil cooler 35 in the oil supply channel 31. When no oil is flowing through the oil supply channel 31, the oil temperature sensor 73 detects the temperature of gas present in the oil supply channel 31 as an oil temperature TL. The oil temperature sensor 73 is a second temperature sensor.

The vehicle 100 includes a display 83. The display 83 is located in a cabin of the vehicle 100. The display 83 is capable of displaying various pieces of information. The vehicle 100 includes an accelerator sensor 78 and a vehicle speed sensor 79. The accelerator sensor 78 detects an accelerator operation amount ACP that is an operation amount of an accelerator pedal in the vehicle 100. The vehicle speed sensor 79 detects a vehicle speed SP that is the travel speed of the vehicle 100.

Schematic Configuration of Controller of Vehicle

The vehicle 100 includes a controller (hereinafter, referred to as vehicle controller) 90. The vehicle controller 90 is an internal device that is a processing device provided in the vehicle 100. The vehicle controller 90 can be made up of one or more processors that execute various processes in accordance with a computer program (software). The vehicle controller 90 may be made up of one or more dedicated hardware circuits, such as application-specific integrated circuits (ASICs), that execute at least some of the various processes, or circuitry including a combination of them. Each processor includes a CPU, and a memory, such as a RAM and a ROM. The memory stores a program code or an instruction configured to cause the CPU to execute a process. The memory, that is, a computer-readable medium, includes any usable medium accessible by a general-purpose or dedicated computer. The vehicle controller 90 includes a storage device that is an electrically rewritable nonvolatile memory. The vehicle controller 90 includes a communication instrument for wirelessly communicating with an external device outside the vehicle 100 via the external communication line network 200. The vehicle controller 90 stores the individual identification information about the vehicle 100 on which the vehicle controller 90 is mounted. The details of the individual identification information are the same as those stored in the server 300.

The vehicle controller 90 receives detection signals from various sensors mounted on the vehicle 100. Specifically, the vehicle controller 90 receives detection signals on the following parameters.

First motor temperature TM1 detected by the first MG sensor 71

Second motor temperature TM2 detected by the second MG sensor 72

Oil temperature TL detected by the oil temperature sensor 73

Accelerator operation amount ACP detected by the accelerator sensor 78

Vehicle speed SP detected by the vehicle speed sensor 79

The vehicle controller 90 includes a travel control unit 91. The travel control unit 91 controls the travel of the vehicle 100. Specifically, the travel control unit 91 calculates a required driving force based on an accelerator operation amount ACP and a vehicle speed SP. The travel control unit 91 controls the internal combustion engine 80, the first MG 11, and the second MG 12 based on the required driving force. The travel control unit 91 substantially controls the first MG 11 and the second MG 12 by controlling the PCU 81.

The vehicle controller 90 includes a determination assistance unit 92. The determination assistance unit 92 is capable of executing a first process. The first process is a process for transmitting information needed to determine whether there is a shortage of oil in the transaxle 10 to the server 300.

The determination assistance unit 92 executes an acquisition process as part of the first process. The determination assistance unit 92 acquires the latest first motor temperature TM1 and the latest oil temperature TL in the acquisition process. The determination assistance unit 92 executes a transmission process as part of the first process. The determination assistance unit 92 transmits determination information J to the server 300 in the transmission process. The determination information J includes the latest first motor temperature TM1, the latest oil temperature TL, the individual identification information of the host vehicle, and an initial oil temperature TLA.

Here, a duration from when an ignition switch of the vehicle 100 is turned on to when the ignition switch is turned off is referred to as one trip. The initial oil temperature TLA is an oil temperature TL that the determination assistance unit 92 acquires in the initial acquisition process of each trip. A value obtained by subtracting the oil temperature TL from the first motor temperature TM1, that is, a difference between the first motor temperature TM1 and the oil temperature TL, is referred to as temperature difference $\Delta T$. The determination assistance unit 92 stores a maximum value in the historical data of the temperature difference $\Delta T$. Here, the historical data includes temperature differences $\Delta T$ from when the vehicle 100 is new to the present time. The determination assistance unit 92 transmits the determination information J to the server 300 by executing the transmission process only when the latest temperature difference $\Delta T$ is greater than the maximum value.

Schematic Configuration of Determining Unit of Server

The determining unit 302 is capable of executing a second process. The second process is a process for determining whether there is a shortage of oil in the vehicle 100.

The determining unit 302 executes a receiving process as part of the second process. Of the vehicles 100, the vehicle 100 that has transmitted the determination information J to the server 300 is referred to as target vehicle. The determining unit 302 receives the determination information J transmitted by the vehicle controller 90 of the target vehicle in the receiving process.

The determining unit 302 executes an identification process as part of the second process. The determining unit 302 identifies the type of the target vehicle based on the individual identification number included in the determination information J in the identification process. The determining unit 302 identifies a prescribed value Z1 and a threshold Z2 associated with the identified vehicle type. The prescribed value Z1 is a reference value in determining whether there is a shortage of oil. The threshold Z2 is a limiting value for preventing an erroneous determination as to whether there is a shortage of oil. The determining unit 302 stores a prescribed value Z1 and a threshold Z2 for each vehicle type.

The determining unit 302 executes a determining process as part of the second process. The determining unit 302 determines whether there is a shortage of oil based on the first motor temperature TM1 and the oil temperature TL in the determining process. Specifically, in the determining process, the determining unit 302 compares the temperature difference $\Delta T$ that is the difference between the first motor temperature TM1 and the oil temperature TL, received in the receiving process, with the prescribed value Z1 identified in the identification process. The determining unit 302 determines that the oil is short when the temperature difference $\Delta T$ is greater than the prescribed value Z1. The prescribed value Z1 is a positive value. In other words, the determining unit 302 determines that the oil is short when the first motor temperature TM1 is higher than the oil temperature TL and the difference between the first motor temperature TM1 and the oil temperature TL is large.

When the initial oil temperature TLA is lower than or equal to the threshold Z2 in each trip, the determining unit 302 prohibits a determination that the oil is short in the determining process until the tip ends. As a specific mode for implementing the above configuration, when the initial oil temperature TLA included in the determination information J is lower than or equal to the threshold Z2, the determining unit 302 does not determine that the oil is short even when the temperature difference $\Delta T$ is greater than the prescribed value Z1. On the other hand, when the initial oil temperature TLA is higher than the threshold Z2 in each trip, the determining unit 302 executes the determining process without prohibiting a determination that the oil is short until the trip ends. In other words, when the initial oil temperature TLA included in the determination information J is higher than the threshold Z2, the determining unit 302 determines that the oil is short when the temperature difference $\Delta T$ is greater than the prescribed value Z1.

The determining unit 302 executes a notification process as part of the second process. In the notification process, when the determining unit 302 determines that the oil is short in the determining process, the determining unit 302 provides notification of a shortage of oil to the vehicle controller 90 of the target vehicle.

The prescribed value Z1 will be described. When no oil is present in the case 10A or when oil is present in the case 10A but the total amount of oil is shorter than an originally required amount, a sufficient amount of oil cannot be supplied to the first MG 11, so the first motor temperature TM1 may increase. Even when the flow rate of oil to the first MG 11 is sufficient, the oil may be not sufficiently cooled and the effect of cooling the first MG 11 may be low. In such a case, the difference between the first motor temperature TM1 and the oil temperature TL increases. The prescribed value Z1 is set in advance by, for example, experiment as a value slightly greater than the maximum value of the temperature difference $\Delta T$ that is permitted when the oil that is able to sufficiently cool and lubricate various areas of the transaxle 10 is present in the case 10A. The heat generation efficiency of the first MG 11 varies depending on the model of the first MG 11 employed in each vehicle. The cooling efficiency of oil varies depending on the model of the oil cooler 35 and the type of oil, employed in each vehicle. The prescribed value Z1 is set for each vehicle type in accordance with the above-described elements employed in each vehicle type.

The threshold Z2 will be described. In an environment in which the ambient temperature is low, the viscosity of oil increases, and the liquidity of oil decreases. In this case, although there is no shortage of oil, oil can be not supplied to the first MG 11 or the flow rate can be small due to a decrease in the liquidity of oil. In this case, although there is no shortage of oil, the first MG 11 cannot be cooled by oil, so the temperature difference $\Delta T$ increases, and an erroneous determination that the oil is short may be performed. At the start of each trip, oil is not flowing through the oil supply channel 31. For this reason, the initial oil temperature TLA becomes a value that substantially reflects an ambient temperature. The threshold Z2 is set in advance by, for example, experiment as the maximum value of ambient temperature by which the liquidity of oil is highly likely to be low and it is not possible to appropriately determine whether there is a shortage of oil. The rate of increase in the viscosity of oil depends on the type of the oil employed in each vehicle 100. The threshold Z2 is set for each vehicle type in accordance with, for example, the type of oil employed in each vehicle.

The server 300 and the vehicle controller 90 of the target vehicle make up a determining device that determines whether there is a shortage of oil. The server 300 and the vehicle controller 90 of the target vehicle make up the oil shortage determining system together with the transaxle 10 of the target vehicle.

Specific Procedure of First Process

Figure 3A:
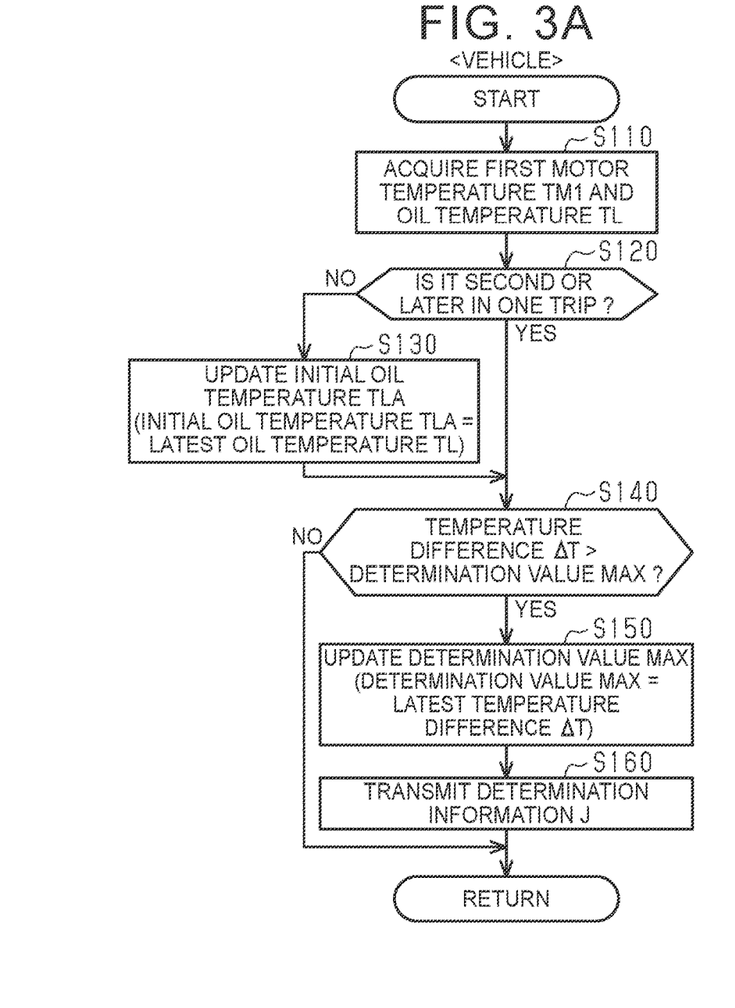
FIG. 3A is a flowchart showing a specific procedure of a first process.

The determination assistance unit 92 of the vehicle controller 90 repeatedly executes the first process during one trip. As will be described later, the determination assistance unit 92 stores an initial oil temperature TLA and a determination value MAX in process of executing the first process. The determination assistance unit 92 keeps the stored initial oil temperature TLA and the determination value MAX without erasing until the initial oil temperature TLA and the determination value MAX are updated in process of executing the next first process regardless of whether the ignition switch is on or off.

As shown in FIG. 3A, the determination assistance unit 92 starts the first process and executes the process of step S110 when the ignition switch of the vehicle 100 turns on. In step S110, the determination assistance unit 92 acquires the latest first motor temperature TM1 and the latest oil temperature TL to be received by the vehicle controller 90. When the determination assistance unit 92 executes the process of step S110, the determination assistance unit 92 proceeds with the process to step S120. The process of step S110 is the acquisition process.

In step S120, the determination assistance unit 92 determines whether the currently executing first process is the second or later first process in the current trip. For this determination, for example, a flag that is cleared when a trip ends is referenced. The flag is set to an on state in the initial first process of each trip. Therefore, the flag is in an off state at the start of the initial first process of each trip and is on at the start of the second or later first process. When the determination assistance unit 92 determines that the currently executing first process is the initial one in the current trip (NO in step S120), the determination assistance unit 92 proceeds with the process to step S130.

In step S130, the determination assistance unit 92 updates the initial oil temperature TLA. Specifically, the determination assistance unit 92 erases the currently stored initial oil temperature TLA and stores the latest oil temperature TL acquired in step S110 as the initial oil temperature TLA. The initial oil temperature TLA erased at this time is the oil temperature TL stored at the time when step S130 is executed in the last trip. When the determination assistance unit 92 executes the process of step S130, the determination assistance unit 92 proceeds with the process to step S140.

On the other hand, when the determination assistance unit 92 determines in step S120 that the currently executing first process is the second or later one in the current trip (YES in step S120), the determination assistance unit 92 skips the process of step S130 and proceeds with the process to step S140. In other words, the determination assistance unit 92 keeps the oil temperature TL acquired in the initial acquisition process in that trip as the initial oil temperature TLA during the trip. As described above, when the determination assistance unit 92 executes step S130 in the next trip, the determination assistance unit 92 updates the initial oil temperature TLA.

In step S140, the determination assistance unit 92 determines whether the temperature difference ΔT that is a value obtained by subtracting the oil temperature TL from the first motor temperature TM1 is greater than the determination value MAX for the first motor temperature TM1 and the oil temperature TL, acquired in step S110. The determination value MAX is the one stored by the determination assistance unit 92 when the determination assistance unit 92 executes step S150 (described later) before. The determination value MAX at the time when step S150 has not been executed once in the past in the vehicle 100, that is, the initial value of the determination value MAX, is zero. When the determination assistance unit 92 determines that the temperature difference ΔT is less than or equal to the determination value MAX (NO in step S140), the determination assistance unit 92 once ends a series of processes of the first process. In this case, the determination assistance unit 92 executes the process of step S110 again.

On the other hand, when the determination assistance unit 92 determines in step S140 that the temperature difference ΔT is greater than the determination value MAX (YES in step S140), the determination assistance unit 92 proceeds with the process to step S150. In step S150, the determination assistance unit 92 updates the determination value MAX. Specifically, the determination assistance unit 92 erases the currently stored determination value MAX and stores the latest temperature difference ΔT as the determination value MAX. In this way, only when the determination assistance unit 92 determines in step S140 that the temperature difference ΔT is greater than the determination value MAX, the determination assistance unit 92 proceeds with the process to step S150 and replaces the determination value MAX with the latest temperature difference ΔT. Therefore, each time the determination assistance unit 92 executes the process of step S150, the determination value MAX increases. In other words, the determination value MAX is the maximum value in the historical data of the temperature difference ΔT. The determination assistance unit 92 continuously stores the determination value MAX until the determination value MAX is updated through the process of step S150 next time. When the determination assistance unit 92 executes the process of step S150, the determination assistance unit 92 proceeds with the process to step S160.

In step S160, the determination assistance unit 92 transmits the determination information J. The determination assistance unit 92 initially generates the determination information J. The determination information J includes the first motor temperature TM1 and the oil temperature TL, acquired by the determination assistance unit 92 in the process of step S110, that is, the latest first motor temperature TM1 and the latest oil temperature TL. The determination information J includes the initial oil temperature TLA stored by the determination assistance unit 92, that is, the oil temperature TL acquired in the initial acquisition process of the current trip. The determination information J includes the individual identification information of the vehicle 100. When the determination assistance unit 92 generates the determination information J, the determination assistance unit 92 transmits the determination information J to the server 300. After that, the determination assistance unit 92 once ends a series of processes of the first process. The determination assistance unit 92 executes the process of step S110 again. The process of step S160 is the transmission process.

Specific Procedure of Second Process

Figure 3B:
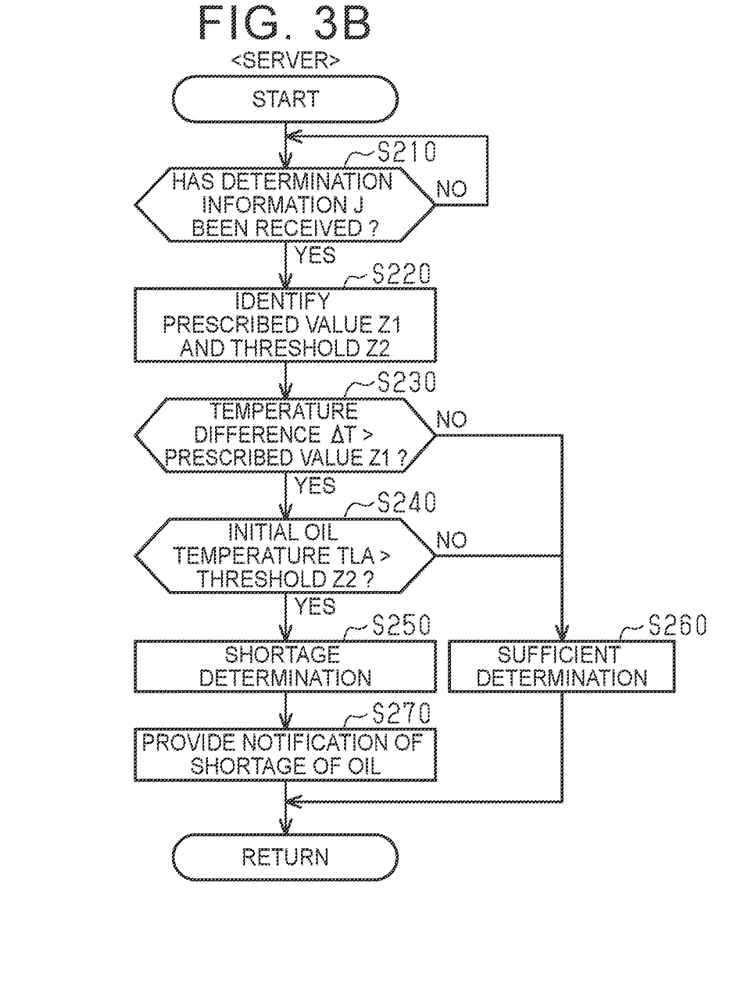
FIG. 3B is a flowchart showing a specific procedure of a second process.

The determining unit 302 of the server 300 repeatedly executes the second process while the server 300 is in operation. As shown in FIG. 3B, when the determining unit 302 starts the second process, the determining unit 302 executes the process of step S210.

In step S210, the determining unit 302 determines whether the determination information J has been received. When the determining unit 302 has not received the determination information J (NO in step S210), the determining unit 302 executes the process of step S210 again. The determining unit 302 repeats the process of step S210 until the determination information J is received. When the determining unit 302 receives the determination information J (YES in step S210), the determining unit 302 proceeds with the process to step S220. The process of step S210 is the receiving process.

In step S220, the determining unit 302 identifies the prescribed value Z1 and the threshold Z2 to be used in the following processes. Specifically, the determining unit 302 identifies the type of the target vehicle based on the determination information J received in step S210. The determining unit 302 identifies the prescribed value Z1 associated with the type of the target vehicle from among the prescribed values Z1 respectively for vehicle types stored therein. The determining unit 302 identifies the threshold Z2 associated with the type of the target vehicle from among the thresholds Z2 respectively for vehicle types stored therein. After that, the determining unit 302 proceeds with the process to step S230. The process of step S220 is the identification process.

In step S230, the determining unit 302 determines whether the temperature difference $\Delta T$ is greater than the prescribed value Z1. Specifically, the determining unit 302 calculates the temperature difference $\Delta T$ from the first motor temperature TM1 and the oil temperature TL, included in the determination information J, and compares the temperature difference $\Delta T$ with the prescribed value Z1 identified in step S220. When the determining unit 302 determines that the temperature difference $\Delta T$ is less than or equal to the prescribed value Z1 (NO in step S230), the determining unit 302 proceeds with the process to step S260.

In step S260, the determining unit 302 determines that a sufficient amount of oil is present. After that, the determining unit 302 once ends a series of processes of the second process. The determining unit 302 executes the process of step S210 again.

On the other hand, when the determining unit 302 determines in step S230 that the temperature difference $\Delta T$ is greater than the prescribed value Z1 (YES in step S230), the determining unit 302 proceeds with the process to step S240. In step S240, the determining unit 302 determines whether the initial oil temperature TLA included in the determination information J is higher than the threshold Z2 identified in step S220. When the determining unit 302 determines that the initial oil temperature TLA is lower than or equal to the threshold Z2 (NO in step S240), the determining unit 302 proceeds with the process to step S260. In other words, even when the determination of step S230 is affirmative and the temperature difference $\Delta T$ is greater than the prescribed value Z1 but when the initial oil temperature TLA is lower than or equal to the threshold Z2, the determining unit 302 determines that a sufficient amount of oil is present. The process of step S240 is to, when the initial oil temperature TLA in a current trip of the target vehicle is lower than or equal to the threshold Z2, prohibit a determination that the oil is short until the trip ends, as described above.

On the other hand, when the determining unit 302 determines in step S240 that the initial oil temperature TLA is higher than the threshold Z2 (YES in step S240), the determining unit 302 proceeds with the process to step S250. In step S250, the determining unit 302 determines that the oil is short. In this case, the determining unit 302 stores the fact that the oil is short as information on the target vehicle in association with the individual identification information of the target vehicle. The determining unit 302 proceeds with the process to step S270. The processes of step S230, step S250, and step S260 make up a determining process.

In step S270, the determining unit 302 provides notification of a shortage of oil to the target vehicle. After that, the determining unit 302 once ends a series of processes of the second process. The determining unit 302 executes the process of step S210 again. The process of step S270 is the notification process.

When the vehicle controller 90 of the target value receives the notification of a shortage of oil from the server 300, the vehicle controller 90 displays a message that the oil in the transaxle 10 is short on the display 83.

Operation of Embodiment

The transaxle 10 can be replaced during maintenance of the vehicle 100. During then, a worker may forget to feed oil into the transaxle 10. Alternatively, for example, the case 10A may be damaged due to an accident or the like and, as a result, an abnormality that oil leaks from the case 10A can occur. As a result, the total amount of oil in the case 10A can be less than an originally required amount. When the total amount of oil in the case 10A is short, various areas of the transaxle 10, including the first MG 11, cannot be sufficiently cooled or lubricated even when oil is circulated within the case 10A by the oil circulation mechanism 30. When the first MG 11 cannot be sufficiently cooled by oil, the first motor temperature TM1 is considerably higher than the oil temperature TL. In the present embodiment, whether there is a shortage of oil is determined based on a temperature difference $\Delta T$ by using such a causal relationship.

As a specific determination procedure, in the present embodiment, initially, through the first process, when the latest temperature difference $\Delta T$ is greater than the determination value MAX that is the maximum value in the historical data of the temperature difference $\Delta T$ (YES in step S140), the determination information J is transmitted from the vehicle controller 90 to the server 300 (step S160). In response to the transmitted determination information J, whether there is a shortage of oil is determined in the second process. In other words, in the second process, when the temperature difference $\Delta T$ based on the determination information J is greater than the prescribed value Z1 associated with the type of the target vehicle (YES in step S230), on condition that the initial oil temperature TLA is higher than the threshold Z2 (YES in step S240), it is determined that the oil is short (step S250).

For example, as in the case where the vehicle 100 travels at a constant speed on a flat road, a travel state in which the load of torque required of the first MG 11 is small can continue. In this case, even if the oil is short and the first MG 11 is not sufficiently cooled by the oil, the temperature difference $\Delta T$ does not increase so much. On the other hand, in a travel state where the load of torque required of the first MG 11 is large as in the case where, for example, the vehicle 100 is accelerating or running on an uphill road, if the oil is short, the temperature difference ΔT increases. In the present embodiment, the first process is repeated during one trip. In this case, even if a travel state where the temperature difference ΔT is difficult to increase just after the start of a trip, a travel state where the temperature difference ΔT is easy to increase is highly likely to be achieved before the trip ends. In other words, by repeating the first process during a trip, the temperature difference ΔT becomes greater than the determination value MAX in accordance with the travel state of the vehicle 100 at a timing during the trip if the oil is short (YES in step S140), and the determination information J is transmitted from the vehicle controller 90 to the server 300 (step S160). Then, the process of the second process proceeds and the fact that the temperature difference ΔT is greater than the prescribed value Z1 is determined (YES in step S230), and it is determined that the oil is short (step S250).

Advantageous Effects of Embodiment (1) When the oil is short and the first MG 11 is not cooled by the oil, the first motor temperature TM1 is considerably higher than the oil temperature TL. Because of such a causal relationship, whether there is a shortage of oil is appropriately determined by checking the temperature difference ΔT that is the difference between the first motor temperature TM1 and the oil temperature TL. Moreover, in the present embodiment, as described in the operation, the first process is repeated during a trip, so a shortage of oil is reliably grasped when the oil is short.

(2) In an environment in which the ambient temperature is low, the viscosity of oil increases, and the liquidity of oil decreases. In this case, although there is no shortage of oil, oil may not be supplied to the first MG 11 due to a decrease in the liquidity of oil. In this case, although there is no shortage of oil, the first MG 11 cannot be cooled by oil, so the difference between the first motor temperature TM1 and the oil temperature TL increases, and an erroneous determination that the oil is short may be performed. Here, when the initial oil temperature TLA is low in one trip, the ambient temperature is basically highly likely to be low in an environment in which the vehicle 100 travels during the trip. For this reason, a situation in which the liquidity of oil is low is highly likely to be continuing during the trip. In the present embodiment, in each trip, when the initial oil temperature TLA is low, a determination that the oil is short is prohibited until the trip ends. With this configuration, the erroneous determination as described above is prevented.

(3) In the present embodiment, the server 300 generally executes the determining processes on the vehicles 100. In other words, the determining processes on the vehicles 100 are executed by one processing device. In employing such a configuration, the prescribed value Z1 and the threshold Z2 for each vehicle type are used. Thus, high determination accuracy on each of the different-type vehicles 100 is ensured. Here, for example, the prescribed value Z1 for each vehicle type can need to be updated. If the update is performed in the case of employing the configuration that each vehicle controller 90 executes the determining process, the prescribed value Z1 needs to be updated for each vehicle 100 while the vehicle type of each of the vehicles 100 is checked, so it takes effort. In terms of this point, with the configuration that the single processing device is shared among the vehicles 100 as in the case of the present embodiment, only the single processing device just needs to be subjected to the process of changing information, and then the prescribed value Z1 just needs to be changed only for the number of vehicle types. Therefore, an update process is extremely simple. In this way, in the present embodiment, management of the processing device that executes the determining process is simplified.

(4) In the present embodiment, in the first process, the determination information J is not transmitted to the server 300 each time the first motor temperature TM1 and the oil temperature TL are acquired, and, only when the temperature difference ΔT is greater than the determination value MAX (YES in step S140), the determination information J is transmitted to the server 300. In other words, only when the temperature difference ΔT is considerably large and oil is highly likely to be short, the transmission process is executed. Therefore, the number of times the vehicle controller 90 communicates with the server 300 is limited to a considerably small number of times. By employing such a configuration, the number of times of communication between the vehicle controller 90 and the server 300 is reduced, so a processing load resulting from communication in each of the vehicle controller 90 and the server 300 is reduced.

(5) In the present embodiment, when it is determined that the oil is short, notification of a shortage of oil is provided to the target vehicle. With this configuration, the user is reliably notified of a shortage of oil.

Modifications

The present embodiment may be modified as follows. The present embodiment and the following modifications may be implemented in combination with each other without any technical contradiction.

The process of step S270 in the second process may be omitted. In other words, the process of providing notification of a shortage of oil to the vehicle controller 90 may be omitted. In this case as well, when the server 300 stores the fact that the oil is short, the information can be read out later and conveyed to the user separately.

Storing the fact that the oil is short in the server 300 in step S250 in the second process is not indispensable. The order of the process of step S230 and the process of step S240 in the second process may be changed. In other words, when the initial oil temperature TLA is lower than or equal to the threshold Z2 in each trip (NO in step S240), a determination in step S230 as to whether the temperature difference ΔT is greater than the prescribed value Z1 may be skipped. With such a mode, when the initial oil temperature TLA is lower than or equal to the threshold Z2 in each trip, a determination that the oil is short in the determining process may be prohibited until the trip ends.

A technique for preventing an erroneous determination in step S240 in the second process is not limited to the example of the above embodiment. For example, instead of the initial oil temperature TLA, the latest oil temperature TL may be compared with the threshold Z2.

The process of step S240 in the second process may be omitted. In other words, the process according to prevention of an erroneous determination may be omitted. When it is determined that the oil is short, including a situation in which a shortage of oil is suspected, in accordance with employment of such a mode, the details of a message to be displayed on the display 83 when it is determined that the oil is short just needs to be changed to a suitable one. From the viewpoint that it is determined that the oil is short in a situation in which the oil is actually short, omission of the process according to prevention of an erroneous determination does not lead to any inconvenience.

As in the case of the above modification, when the latest oil temperature TL is used in the process of step S240 or the process of step S240 is omitted, the processes of step S120 and step S130 of the first process are not necessary. In other words, the initial oil temperature TLA does not need to be stored. In addition, the initial oil temperature TLA does not need to be included in the determination information J in step S160.

In the above embodiment, the determination value MAX to be used in step S150 is a maximum value in the historical data of the temperature difference ΔT from when the vehicle 100 is manufactured; however, the determination value MAX is not limited thereto. The determination value MAX just needs to be a maximum value in the historical data of the temperature difference ΔT in a past certain period. For example, in determining that the oil is short in the case where oil is forgot to be fed at the time of replacement of the transaxle 10, the determination value MAX is desirably the maximum value in the historical data from before replacement of the transaxle 10 to a current point in time. When the determination value MAX stored in the vehicle controller 90 is once reset, the maximum value in the historical data of the temperature difference ΔT in a period after the timing of reset may be set for the determination value MAX.

The processes of step S140 and step S150 in the first process may be omitted. In other words, as a condition for transmitting the determination information J to the server 300, a condition that the temperature difference ΔT is considerably large does not need to be provided. Each time the first motor temperature TM1 and the oil temperature TL are acquired, the first motor temperature TM1 and the oil temperature TL may be transmitted to the server 300 as the determination information J. In this case as well, there is no inconvenience in determining whether there is a shortage of oil.

In step S160 in the first process, the details of the determination information J are not limited to the example of the embodiment. For example, the temperature difference ΔT between the first motor temperature TM1 and the oil temperature TL may be transmitted as information related to the first motor temperature TM1 and the oil temperature TL. In other words, as long as the server 300 is able to grasp or calculate the temperature difference ΔT by using information, it can be employed as information related to the first motor temperature TM1 and the oil temperature TL. For example, a transmission date and time of the determination information J may be included in the determination information J. When it is determined in step S250 in the second process that the oil is short, the above transmission date and time may be stored in the server 300 in synchronization with the operation that the fact that the oil is short is stored. Such information is useful in seeking for a cause of a shortage of oil.

The vehicle controller 90 may determine whether there is a shortage of oil. In other words, the vehicle controller 90 acquires the first motor temperature TM1 and the oil temperature TL and then compares the temperature difference ΔT that is the difference between the first motor temperature TM1 and the oil temperature TL with the prescribed value Z1 to determine whether there is a shortage of oil. At this time, the initial oil temperature TLA may be compared with the threshold Z2 and used to prevent an erroneous determination. When the processes of step S230, step S240, step S250, and step S260 in the second process are combined with the processes of step S110, step S120, and step S130 in the first process in the above embodiment, such a mode is implemented. When the vehicle controller 90 determines whether there is a shortage of oil, the prescribed value Z1 and the threshold Z2, associated with the vehicle type of the host vehicle, just need to be stored in advance in the vehicle controller 90.

When a determination as to whether there is a shortage of oil is performed by the vehicle controller 90, the determining device is made up of only the vehicle controller 90, and the oil shortage determining system is made up of only the components of the vehicle 100, that is, the vehicle controller 90 and the transaxle 10. In other words, when a determination as to whether there is a shortage of oil is performed by the vehicle controller 90, a series of processes related to a determination as to whether there is a shortage of oil is completed in the vehicle 100, so the configuration of the oil shortage determining system is simple. When a determination as to whether there is a shortage of oil is performed by the vehicle controller 90, the process of transmitting the determination information J from the vehicle controller 90 to the server 300 is not required, so installation of devices for communication and the load of a communication process are reduced.

The details of the prescribed value Z1 are not limited to the example of the embodiment. The prescribed value Z1 may be set as needed in accordance with a reference based on which a shortage of oil is determined when how much the total amount of oil in the case 10A is. When, for example, only the case where the oil is completely not present in the case 10A is set as a shortage of oil, a minimum value of the temperature difference ΔT, which cannot occur when at least a small amount of oil is present, may be set as the prescribed value Z1.

The details of the threshold Z2 are not limited to the example of the embodiment. The threshold Z2 just needs to be set to an appropriate value as a limiting value for preventing an erroneous determination. Instead of the first motor temperature TM1, the temperature difference ΔT may be calculated by using the second motor temperature TM2. In this case, of the first process and the second process of the embodiment, in the process using the first motor temperature TM1, the first motor temperature TM1 may be replated with the second motor temperature TM2. When the second motor temperature TM2 is used, the prescribed value Z1 just needs to be changed to an appropriate value according to the second motor temperature TM2.

A determination as to whether there is a shortage of oil by using the temperature difference ΔT based on the first motor temperature TM1 and a determination as to whether there is a shortage of oil by using the temperature difference ΔT based on the second motor temperature TM2 may be performed in parallel. In this case, for example, in parallel with the first process and the second process described in the embodiment, the first process and the second process for the second motor temperature TM2 just need to be executed.

The configuration of the oil circulation mechanism 30 is not limited to the example of the embodiment. The oil circulation mechanism 30 just needs to be configured such that oil is supplied from a portion where oil is stored (hereinafter, referred to as oil storage portion) to various areas of the transaxle 10 and oil returns to the oil storage portion again. For example, the oil cooler 35 may be disposed at a location different from that of the embodiment in the oil supply channel 31. Alternatively, for example, an oil pan may be provided as an oil storage portion at a location different from the case 10A, and oil may be supplied from the oil pan to various areas of the transaxle 10. A plurality of oil pumps may be provided, and oil may be pumped by a different oil pump for each path of the oil supply channel 31. The path of the oil supply channel 31 may be changed from the one in the embodiment.

The configuration of the oil temperature sensor 73 is not limited to the example of the embodiment. For example, the oil temperature sensor 73 may be located on the upstream side of the oil cooler 35 in the oil supply channel 31. The prescribed value Z1 and the threshold Z2 just need to be set in accordance with the characteristics of the oil temperature TL detected by the oil temperature sensor 73 at a location where the oil temperature sensor 73 is installed.

A detection target of a temperature to be detected by the first MG sensor 71 is not limited to the example of the embodiment. The temperature of the coil 11C is also transferred to the stator 11S. The first MG sensor 71 may, for example, detect the temperature of the stator 11S as the first motor temperature TM1. In this case, the prescribed value Z1 just needs to be set to an appropriate value on the assumption that the first motor temperature TM1 is the temperature of the stator 11S.

As in the case of the modification, a detection target of which the temperature is detected by the second MG sensor 72 is also not limited to the example of the embodiment. The configuration of the transaxle 10 is not limited to the example of the embodiment. The transaxle may include a transmission that changes a speed ratio as a power transmission mechanism. The transaxle may be made up of, for example, only one motor generator.

The overall configuration of the vehicle 100 is not limited to the example of the embodiment. The vehicle may be an electric vehicle that does not include an internal combustion engine and that includes only a motor generator as a driving source. A vehicle is an application target of the oil shortage determining system as long as the vehicle includes a motor serving as a driving source, a power transmission mechanism that transmits the power of the motor to drive wheels, an oil circulation mechanism that circulates oil for cooling the power transmission mechanism and the motor, a first temperature sensor that detects the temperature of the motor, a second temperature sensor that detects the temperature of oil, and a controller.

The server 300 may store the latest first motor temperature TM! and the latest oil temperature TL when the server 300 receives the latest first motor temperature TM1 and the latest oil temperature TL, included in the determination information J. Data of the temperature difference ΔT calculated from the first motor temperature TM1 and the oil temperature TL may be accumulated. The prescribed value Z1 may be updated by using data of the accumulated temperature differences ΔT.

Here, in updating the prescribed value Z1, the following mode is conceivable. In other words, the vehicle controller 90 sequentially stores the first motor temperature TM1 and the oil temperature TL each time the vehicle controller 90 acquires the first motor temperature TM1 and the oil temperature TL, and transmits the accumulated data group to the server 300 when a certain data amount is accumulated. The server 300 calculates a time series of the temperature difference ΔT by using the received data group and extracts and stores the maximum temperature difference ΔT from among the time series. Transmission of a data group from the vehicle controller 90 and extraction and storage of the maximum temperature difference ΔT in the server 300 are repeated, and, when a considerable amount of data of the maximum temperature difference ΔT is stored in the server 300, the prescribed value Z1 is updated by using the data of the maximum temperature difference ΔT. When such a mode is implemented, a considerably large storage capacity of the vehicle controller 90 just needs to be ensured to store data groups of the first motor temperature TM1 and the oil temperature TL in the vehicle controller 90.

In terms of this point, as in the case of the first process of the embodiment, when the first motor temperature TM1 and the oil temperature TL are transmitted from the vehicle controller 90 to the server 300 only when the temperature difference ΔT is greater than the determination value MAX, data that should be stored in the vehicle controller 90 may be only the determination value MAX. Therefore, a large storage capacity of the vehicle controller 90 does not need to be ensured. In this way, when the prescribed value Z1 is updated by using data of the temperature difference ΔT as well, a mode in which the first motor temperature TM1 and the oil temperature TL are transmitted to the server 300 only when the temperature difference ΔT is greater than the determination value MAX is suitable.

What is claimed is:

1. An oil shortage determining system comprising:
    a motor serving as a driving source of a vehicle;
    a power transmission mechanism configured to transmit power of the motor to a drive wheel of the vehicle;
    an oil circulation mechanism configured to circulate oil for cooling the power transmission mechanism and the motor;
    a first temperature sensor configured to detect a temperature of the motor;
    a second temperature sensor configured to detect a temperature of the oil; and
    a determining device configured to determine whether there is a shortage of the oil, wherein:
    the determining device is configured to execute
        an acquisition process of acquiring a temperature of the motor and a temperature of the oil, and
        a determining process of determining whether there is a shortage of the oil based on the temperature of the motor and the temperature of the oil;
    in the determining process, the determining device is configured to determine that the oil is short when the temperature of the motor is higher than the temperature of the oil and a difference between the temperature of the motor and the temperature of the oil is greater than a predetermined prescribed value;
    where a duration from when an ignition switch of the vehicle is turned on to when the ignition switch is turned off is one trip;
    the determining device is configured to, when the temperature of the oil to be acquired in the initial acquisition process of each trip is lower than or equal to a predetermined threshold, prohibit a determination that the oil is short in the determining process until the trip ends; and
    the determining device is configured to, when the temperature of the oil to be acquired in the initial acquisition process of each trip is higher than the threshold, execute the determining process without prohibiting a determination that the oil is short until the trip ends.

2. The oil shortage determining system according to claim 1, wherein:
    the determining device includes an internal device provided in a target vehicle that is a vehicle set as a target for determination as to whether there is a shortage of the oil, and an external device provided outside the target vehicle;
    the external device is capable of wirelessly communicating with the internal device and stores the prescribed value for each of a plurality of vehicle types;

the internal device is configured to execute the acquisition process and a transmission process of transmitting information on the temperature of the motor and the temperature of the oil, acquired in the acquisition process, to the external device together with vehicle type information of the target vehicle;

the external device is configured to execute a receiving process of receiving the information transmitted in the transmission process, an identification process of identifying the prescribed value associated with the vehicle type information received in the receiving process, and the determining process; and in the determining process, the external device is configure to acquire a difference between the temperature of the motor and the temperature of the oil based on the information acquired in the receiving process, and compare the acquired difference with the prescribed value identified in the identification process.

3. The oil shortage determining system according to claim 2, wherein:

the internal device stores a maximum value in historical data of a difference between the temperature of the motor and the temperature of the oil, acquired in the acquisition process; and the internal device is configured to, only when a difference between a latest temperature of the motor and a latest temperature of the oil is greater than the maximum value, transmit the latest temperature of the motor and the latest temperature of the oil in the transmission process.

4. The oil shortage determining system according to claim 2, wherein the external device is configured to, when the external device determines in the determining process that the oil is short, execute a notification process of providing notification of a shortage of the oil to the internal device.

5. An oil shortage determining system comprising:

a motor serving as a driving source of a vehicle;

a power transmission mechanism configured to transmit power of the motor to a drive wheel of the vehicle;

an oil circulation mechanism configured to circulate oil for cooling the power transmission mechanism and the motor;

a first temperature sensor configured to detect a temperature of the motor;

a second temperature sensor configured to detect a temperature of the oil; and a determining device configured to determine whether there is a shortage of the oil, wherein:

the determining device is configured to execute an acquisition process of acquiring a temperature of the motor and a temperature of the oil, and a determining process of determining whether there is a shortage of the oil based on the temperature of the motor and the temperature of the oil;

in the determining process, the determining device is configured to determine that the oil is short when the temperature of the motor is higher than the temperature of the oil and a difference between the temperature of the motor and the temperature of the oil is greater than a predetermined prescribed value;

the determining device includes an internal device provided in a target vehicle that is a vehicle set as a target for determination as to whether there is a shortage of the oil, and an external device provided outside the target vehicle;

the external device is capable of wirelessly communicating with the internal device and stores the prescribed value for each of a plurality of vehicle types;

the internal device is configured to execute the acquisition process and a transmission process of transmitting information on the temperature of the motor and the temperature of the oil, acquired in the acquisition process, to the external device together with vehicle type information of the target vehicle;

the external device is configured to execute a receiving process of receiving the information transmitted in the transmission process, an identification process of identifying the prescribed value associated with the vehicle type information received in the receiving process, and the determining process; and in the determining process, the external device is configured to acquire a difference between the temperature of the motor and the temperature of the oil based on the information acquired in the receiving process, and compare the acquired difference with the prescribed value identified in the identification process.

6. The oil shortage determining system according to claim 5, wherein:

the internal device stores a maximum value in historical data of a difference between the temperature of the motor and the temperature of the oil, acquired in the acquisition process; and the internal device is configured to, only when a difference between a latest temperature of the motor and a latest temperature of the oil is greater than the maximum value, transmit the latest temperature of the motor and the latest temperature of the oil in the transmission process.

7. The oil shortage determining system according to claim 5, wherein the external device is configured to, when the external device determines in the determining process that the oil is short, execute a notification process of providing notification of a shortage of the oil to the internal device.

* * * * *